United States Patent [19]

Veenstra et al.

[11] Patent Number: 5,083,231
[45] Date of Patent: Jan. 21, 1992

[54] RIBBED CLEANING APPARATUS FOR DISK CARTRIDGES

[75] Inventors: Kevin C. Veenstra, St. Paul; Jon R. Clark, Minneapolis, both of Minn.

[73] Assignee: Minnesota Mining and Manufacturing Company, St. Paul, Minn.

[21] Appl. No.: 565,693

[22] Filed: Aug. 13, 1990

[51] Int. Cl.$^5$ .............................................. G11B 23/03
[52] U.S. Cl. .................................. 360/133; 360/130.3
[58] Field of Search .............................. 360/133, 130.3

[56] References Cited

U.S. PATENT DOCUMENTS

| | | | |
|---|---|---|---|
| 4,620,247 | 10/1986 | Papciak et al. | 360/133 |
| 4,626,949 | 12/1986 | Brock et al. | 360/133 |
| 4,677,517 | 6/1987 | Gelardi et al. | 360/133 |
| 4,814,926 | 3/1989 | Gulbrandsen | 360/133 |
| 4,970,618 | 11/1990 | Kato et al. | 360/133 |
| 4,979,065 | 12/1990 | Ikebe et al. | 360/133 |

FOREIGN PATENT DOCUMENTS 3540560 5/1986 Fed. Rep. of Germany.

*Primary Examiner*—John H. Wolff
*Attorney, Agent, or Firm*—Gary L. Griswold; Walter N. Kirn; Charles D. Levine

[57] ABSTRACT

A disk cartridge including a rotatable disk, a cartridge case for housing the disk having upper and lower shells, and a cleaning wiper disposed between each surface of the disk and the respective upper and lower shells is disclosed. A lifter is mounted on the lower shell for biasing the wipers into contact with the disk. Ribs are mounted on the upper shell opposite the lifter. The ribs are substantially parallel to the disk radius and substantially perpendicular to the direction of rotation of the disk and extend for substantially the entire radius of the disk. The ribs maintain a minimum level of wiping pressure on the disk along the entire radius of the disk. 3:1.9.

9 Claims, 2 Drawing Sheets

RIBBED CLEANING APPARATUS FOR DISK CARTRIDGES

TECHNICAL FIELD

The present invention relates to rigid disk cartridges. More particularly, the present invention relates to cleaning devices for magnetic or optical disk cartridges.

BACKGROUND OF THE INVENTION

Rigid recording disk cartridges having a circular, floppy magnetic or optical disk rotatably mounted within the disk cartridge case are well known. The cartridge is mountable on a disk drive apparatus to rotate the recording disk within the cartridge and access the disk by a magnetic or optical recording head for recording or reproducing information. The disk cartridge includes a rotatable magnetic or optical disk and a rectangular cartridge case for housing the disk having a central axis. A head access opening is formed in the cartridge to permit a recording head to access the magnetic disk. The head access opening is opened and closed by the shutter which slides along a front peripheral edge between open and closed positions.

A pair of annular wipers are disposed in the cartridge to remove debris from the disk surface. The wipers are made of cleaning material, and cover the entire recording surface area of the disk. One wiper is disposed between each side of the disk and the respective upper and lower shells. The wipers are biased into contact with the disk surfaces to clean the disk.

In U.S. Pat. No. 4,626,949 to Brock, et al., a disk cartridge having cleaning wipers mounted on radial projections is disclosed. However, the projections are formed on both shells of the cartridge to cause the disk to undulate in and out of the projections.

U.S. Pat. No. 4,677,517 to Gelardi et al. discloses a cleaning apparatus for disk cartridges in which the lifter or wiper is metallic and is disposed in a ramp molded into the cartridge shell. Opposing rib configurations are not disclosed.

In one commercially known embodiment of cleaning apparatus shown in FIG. 1 and described in U.S. Pat. No. 4,620,247 to Papciak et al. and German Patent No. DE 3,540,560, a biasing device, such as a cantilevered lifter 58, is mounted on the lower shell 14 for biasing the wipers 54, 56 into contact with the disk 18. A series of parallel ribs 59 is mounted on the upper shell 12 opposite the biasing lifter 58. The ribs 59 are generally parallel to the direction of rotation of the disk 18 and generally perpendicular to the radius of the disk 18, being oriented approximately 15° relative to the head access slot. The width of the ribs 59 ranges from 0.38 mm (0.015 in) to 0.76 mm (0.030 in), and the pitch of the ribs 59 ranges from 1.78 mm (0.070 in) to 2.03 mm (0.080 in).

However, this configuration does not insure consistent cleaning along the entire radius (from the inner diameter to the outer diameter) of the disk. Most of the cleaning of the disk by the wipers occurs along the leading edge of the ribs due to the force of the cantilevered lifter. The rib surface area along this leading edge next to the disk is only approximately 25% to 40% of the recording surface of the disk. Additionally, the voids between the ribs prevent sufficient pressure from being applied to the disk because the liner is pressed into and conforms to the voids. This leaves gaps where the wiper does not contact the disk.

Although replacing the ribs with a second lifter eliminates the voids, it does not establish a consistent axial disk location. The difference between the height of the disk against the lifters (the axial distance from the reference plane, defined as the bottom of the lower shell, to the lifters) and the height of the disk between the drive heads (the axial distance from the reference plane to the drive heads) varies unacceptably. When two lifters are used, this axial or vertical height difference, or angle of attack, depends on the relative force of the top lifter to the bottom lifter. This relative force depends on the relative bend angles of the lifters, their horizontal placement within the cartridge, and their relative thicknesses. As the relative production tolerances for the lifter are significantly larger than for injection molded ribs, the axial location of the disk varies more with two lifters than with the lifter and rib system. Additionally, using two lifters increases material costs and cartridge assembly time.

Although replacing the ribs with a second lifter, as is known in the prior art, eliminates the voids, it does not establish a consistent difference between the height of the disk against the lifters and the height of the disk between the drive heads. When two lifters are used, the vertical height difference, or angle of attack, depends on the relative force of the top lifter to the bottom lifter. This relative force depends on the relative bend angles of the lifters, their horizontal placement within the cartridge, and their relative thicknesses. As the relative production tolerances for the lifter are significantly larger than for injection molded ribs, the height location of the disk varies more with two lifters than with the lifter and rib system. Additionally, using two lifters increases material costs and cartridge assembly time.

SUMMARY OF THE INVENTION

There is a need for a cartridge with a cleaning configuration which insures consistent cleaning along the entire recording radius of the disk and not only approximately 25% to 40% of the recording surface of the disk. There is a need for a ribbed cleaner in which sufficient pressure is applied to the disk.

The present invention improves on the cleaners of known disk cartridges by re-orienting the cleaning ribs. The disk cartridge includes a rotatable magnetic disk, a cartridge case for housing the magnetic disk having a central axis and a front peripheral edge, and a U-shaped shutter slidably disposed on the front peripheral edge of the cartridge case. The case includes a generally rectangular upper shell and a generally rectangular lower shell which mate to form the outer dimensions of the case. A drive shaft opening is formed through a central portion of the lower shell and receives a drive shaft to rotate the magnetic disk within the cartridge case. A head access opening is formed in both the upper and lower shells between the central axis and the front peripheral edge to access the magnetic disk. The head access opening is openable and closable by the shutter which has an opening which registers therewith. A spring biases the shutter closed.

The cartridge also includes a cleaning device which removes debris from the disk surface. The cleaning device includes two wipers made of cleaning material, each having a surface area covering the entire recording surface area of the disk. One wiper is disposed between each surface of the disk and the respective upper and lower shells. A biasing device such as a lifter is mounted on one of the shells for biasing the wipers into contact with the disk. The lifter may be mounted at one end to the shell and extend away from that shell at its opposite end. A series of substantially parallel ribs is mounted on the other of the shells opposite the lifter. Preferably, the lifter is mounted on the lower shell and the ribs are mounted on the upper shell. The ribs are generally parallel to the radius of the disk and extend for substantially the entire radius of the disk. The ribs maintain a minimum level of wiping pressure on the disk along the entire radius of the disk. The ribs may have slots at various radial locations along their length, such that the slots in adjacent ribs are located at different radial locations along their length to insure that all radial locations on the disk are effectively cleaned.

DETAILED DESCRIPTION OF PREFERRED EMBODIMENTS

Figure 1:
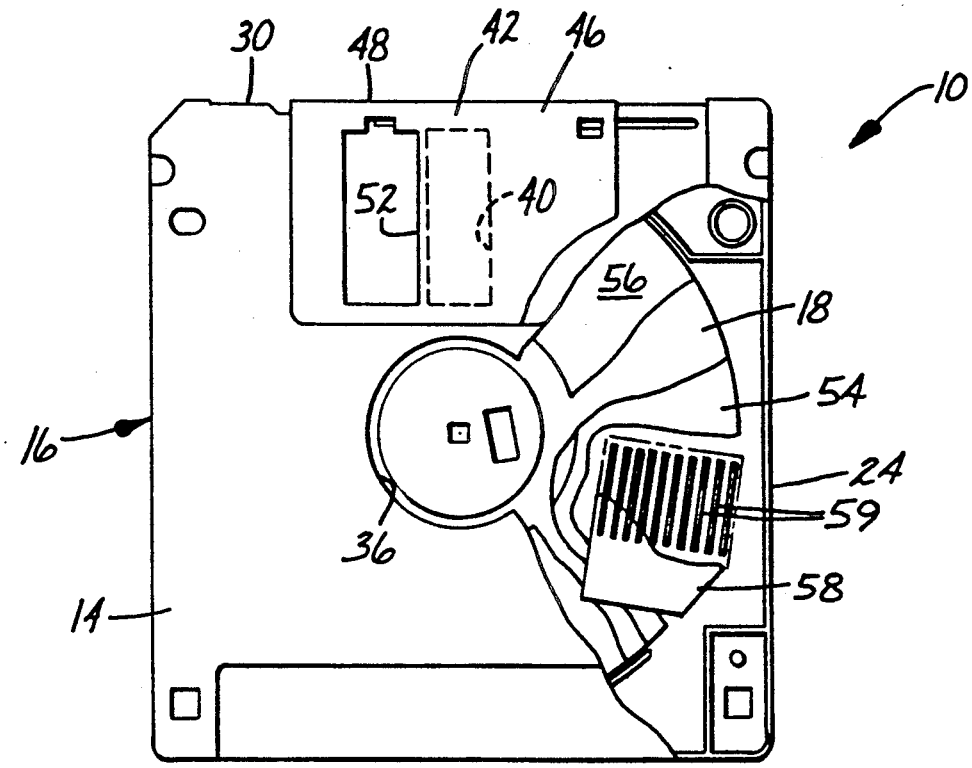
FIG. 1 is a bottom view of a prior art disk cartridge with a portion of the cartridge broken away to show interior details.
Figure 2:
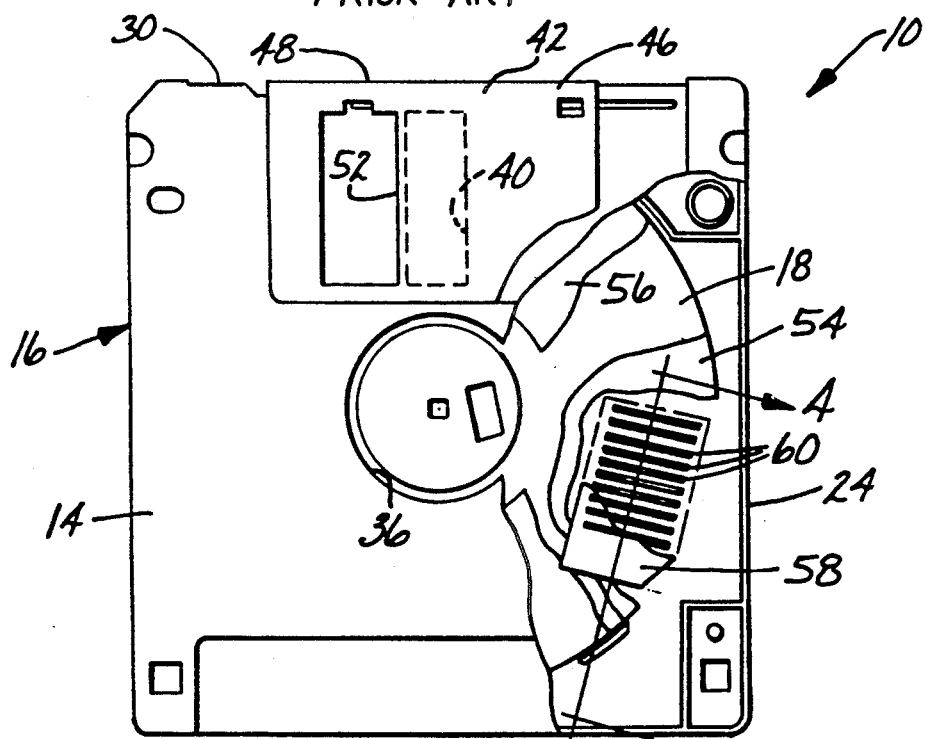
FIG. 2 is a bottom view of a disk cartridge according to the present invention with a portion of the cartridge broken away to show interior details.
Figure 3:
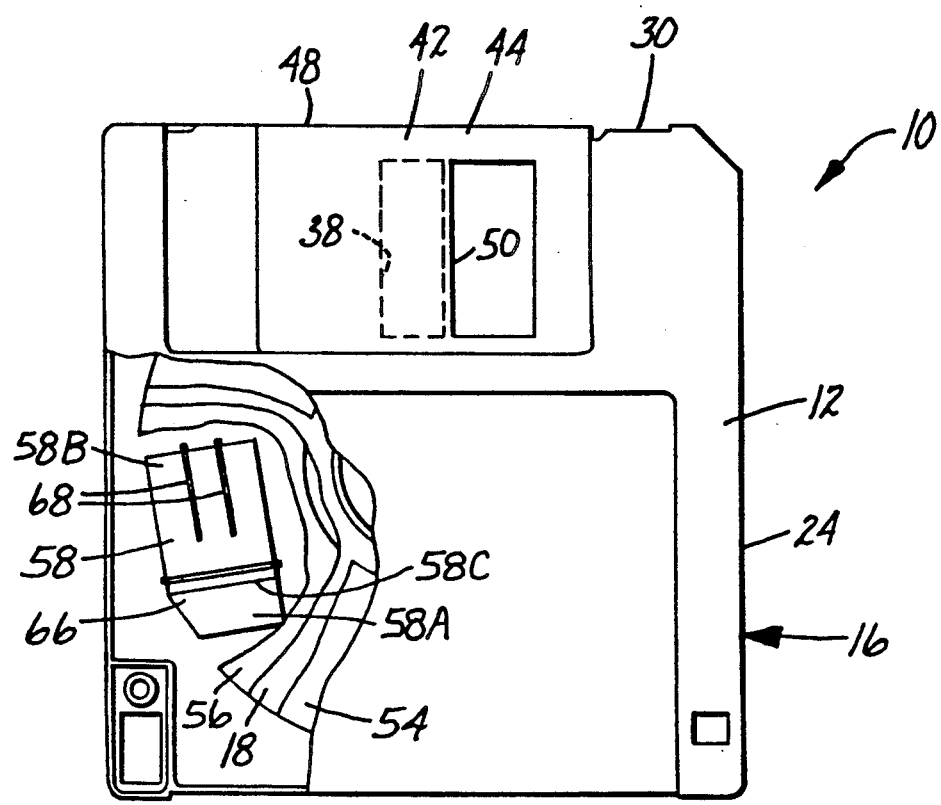
FIG. 3 is a top view of the disk cartridge of FIG. 2 with a portion of the cartridge broken away to show interior details.

A 3½ inch rigid disk cartridge is illustrated in the figures and described below. However, the present invention could also be adapted for and used with 5¼ inch disk cartridges, 2 inch disk cartridges, or other sized cartridges in addition to non-rigid disk cartridges. Referring to FIGS. 2 and 3, the cartridge 10 includes an upper shell 12 and a lower shell 14 which are substantially identical in shape and matingly form a thin, substantially rectangular jacket or case 16. The case 16 is preferably formed of a rigid plastic material such as injection molded ABS resin. A circular, floppy disk 18 formed with a magnetizable coating and having a circular central hub typically formed of metal is rotatably mounted within the case 16. Peripheral edge walls extend perpendicularly from the upper and lower shells 12, 14 and form the side walls 24 of the case 16 and an interior pocket for the disk 18. The front portions of the side walls 24 form the front edge wall 30 of the case 16.

The upper and lower shells 12, 14 each have a circular area (not shown) in which the disk 18 resides. The lower shell 14 has a central opening 36 aligned with a central axis of the disk 18 for receiving an external drive shaft of a disk drive apparatus (not shown) to drive and rotate the disk 18 within the case 16. The upper and lower shells 12, 14 also have elongated, generally rectangular access openings 38, 40 located between the central axis of the case 16 and the front edge wall 30. The access openings 38, 40 permit a read-write head (not shown) of the disk drive apparatus to access the disk 18.

A shutter 42 is slidably disposed on the front edge wall 30 and is formed of an upper arm 44, a lower arm 46, and a base portion 48. Each arm 44, 46 has a respective opening 50, 52 which registers with the upper and lower head access openings 38, 40, respectively, as the shutter 42 slides between open and closed positions.

The cartridge also includes a cleaning device which removes debris from the disk surfaces. The cleaning device includes two circular wipers 54, 56 having a central opening to receive the central hub of the disk 18. Although circular wipers are commonly used, other shaped washers can be used. The wipers 54, 56 are preferably made of thin, soft, flexible, porous organic polymeric material, such as nonwoven polyester cleaning fabric, with each wiper having a surface area covering the entire recording surface area of the disk 18. One wiper 54 is disposed between the upper surface of the disk 18 and the upper shell 12 and the other wiper 56 is disposed between the lower surface of the disk 18 and the lower shell 14 within their respective shell circular areas. The wipers 54, 56 are fastened to their respective shells 12, 14 by adhesive, heat sealing, or other means, so that the wipers remain stationary as the disk 18 rotates. Each wiper 54, 56 contacts the disk surfaces to wipe debris from the disk 18. The wipers 54, 56 also serve as shock absorbers and bearing devices to permit the disk 18 to rotate without contacting the shells 12, 14.

The cleaning device also includes a biasing device such as a lifter 58 and a series of parallel ribs 60. The lifter 58 is mounted on the lower shell 14 for biasing the wipers 54, 56 into contact with the disk 18. The ribs 60 are mounted on the upper shell 12 opposite the lifter 58 and project from the upper shell 12 to the disk 18. In an alternative embodiment, the shell locations of the lifter 58 and ribs 60 can be reversed. Preferably, the lifter 58 and rib series 60 are located at an angular offset of 120° from the head access openings in the rotational direction of the disk 18.

Figure 4:
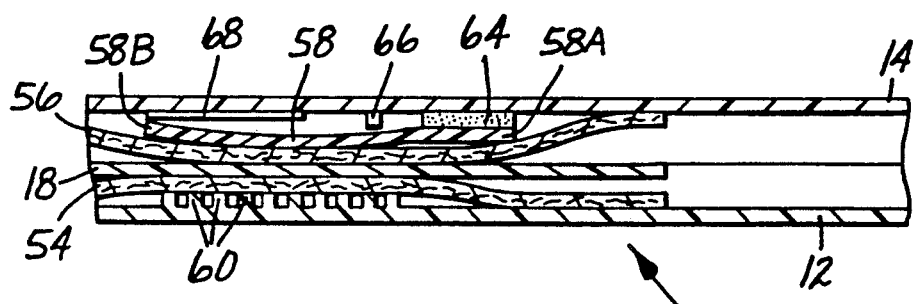
FIG. 4 is a cross-sectional view of the disk cartridge taken along line 4—4 of FIG. 2.

As the ribs 60 are substantially parallel to each other all of the ribs 60 cannot be parallel to the disk radius and perpendicular to the disk rotation direction. Nonetheless, the ribs 60 are oriented so that the series of ribs 60 as a whole is generally parallel to the radius of the disk 18 and perpendicular to the direction of rotation of the disk 18, as shown in FIGS. 2 and 4. The ribs 60 extend for, and maintain a minimum level of wiping pressure on, substantially the entire recording radius of the disk 18. This maintains the facing surface of the ribs 60 in contact with the upper wiper 54 and prevents the wiper 54 from undulating between adjacent ribs and detracting from the cleaning performance. The ribs 60 also set the vertical offset, called the angle of attack of the disk 18 into the read-write head of the disk drive. The angle of attack of the disk 18 is critical to cartridge performance as it affects the electromagnetic performance via the contact area and wrap of the disk 18 around the heads, the durability of the disk 18, and the transient error performance. The angle of attack affects transient errors by affecting the ability of debris to get between the heads and the disk 18 to separate the heads from the disk 18 and cause spacing loss errors. (When the heads are separated from the disk 18 to create a spacing gap, the strength of the magnetic data signal is reduced. If the signal is too low, the data is not read or written and an error occurs.)

Figure 5:
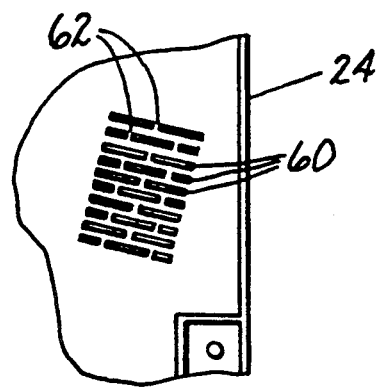
FIG. 5 is a partial bottom view showing only the inside of the upper shell of the disk cartridge according to another embodiment of the present invention.

All of the ribs 60 are formed within a 45° arc (one eighth) of the disk circumference on only one of the shells 12, 14 of the cartridge 10. Preferably, the ribs 60 are solid. Alternatively, as shown in FIG. 5, each rib 60 may have slots 62 at spaced radial locations along its length, such that the slots 62 in adjacent ribs 60 are located at different radial locations to insure that all radial locations on the disk 18 are effectively cleaned. The slots 62 provide an outlet for air flow caused by the rotation of the disk 18 in addition to the porosity of the nonwoven wipers 54, 56. When slots 62 are used, it is preferred to maintain the ratio of the slot width to the segmented rib length below one.

The lifter 58 sandwiches the disk 18 between the two wipers 54, 56 and against the ribs 60 mounted on the upper shell 12. The lifter 58 provides an axially exerted bias against the wiper 54 to produce a localized wiping action upon the adjacent portions of the disk 18 as the disk rotates. The lifter 58 is an elongated piece of plastic sheeting preferably formed of a resilient, relatively rigid, temperature stable material such as polyethylene teraphthalate between 0.0508 mm and 0.127 mm thick. Alternatively, the lifter can be metallic. Although many configurations for the lifter 58 can be used, it is preferred that the lifter 58 be mounted at one end 58a to the lower shell 14 by pressure sensitive adhesive 64, and extend away from the shell 14 in a cantilever fashion at its opposite end 58b. Additionally, the lifter 58 may be creased at 58c to create a bias toward the disk 18. The lifter 58 is further biased toward the disk 18 by a rib or bar 66 mounted on the cartridge lower shell 14 as best shown in FIGS. 3 and 4. Two additional parallel ribs or bars 68, perpendicular to bar 66, provide additional support and biasing action for the lifter 58. These elements provide the desired disk drag and surface wiping action and insure adequate cleaning contact between the disk 18 and the wipers 54, 56.

By orienting ribs 60 parallel to the radial direction of the disk 18, effective cleaning contact along the entire recording radius of the disk 18 is achieved. Dust and other contaminating particles are removed from the surfaces of the disk 18. The rib orientation applies sufficient pressure to the disk 18 because the wipers 54, 56 do not conform to spaces between the ribs 60 in the radial direction. A second lifter is not required. Additionally, the ribs 60 control vertical disk movement relative to the drive heads and provide a stable platform which sets the angle of attack of the disk 18 to the drive heads. This improves the electromagnetic and transient performance of the disk 18 and reduces physical wear of the disk 18 by the heads.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although magnetic disks have been described, the invention can be used with optical and other media disks as well. 3:1.4

We claim:

1. A disk cartridge comprising:
 a cartridge case for housing a rotatable disk having a data recording area, the cartridge case comprising upper and lower shells mating to form the outer dimensions of the cartridge case, one shell having a drive shaft opening which receives a drive shaft to rotate the disk within the cartridge case, and at least one shell having a head access opening for accessing the disk;
 two wipers for removing debris from the surface of the disk, wherein the wipers are made of cleaning material, and each wiper has a surface area covering the entire recording surface area of one side of the disk, and being disposed between one side of the disk and the respective upper and lower shells;
 biasing means mounted on one shell for biasing the wipers into contact with the disk; and
 a series of substantially parallel ribs mounted on the outer shell opposite the biasing means, wherein the ribs are oriented in a direction generally parallel to the radius of the disk and extend for substantially the entire radius of the disk to locate the ends of the ribs outside of the data recording area and to maintain constant contact between each wiper and the respective surface of the disk along substantially the entire radius of the disk.

2. The disk cartridge of claim 1 wherein the cartridge case is rigid.

3. The disk cartridge of claim 1 wherein the biasing means is mounted on the lower shell and the series of ribs is mounted on the upper shell and maintains a minimum level of wiping pressure on the disk along the entire radius of the disk.

4. The disk cartridge of claim 1 wherein the biasing means comprises a lifter mounted at one end to one of the upper or lower shells and extending away from the shell on which it is mounted at its opposite end.

5. A substantially flat rigid disk cartridge comprising:
 a disk having a data recording area;
 a cartridge case for rotatably housing the disk having a central axis and a front peripheral edge, and comprising a generally rectangular upper shell and a generally rectangular lower shell mating to form the outer dimensions of the cartridge case; a drive shaft opening formed in one shell which receives a drive shaft to rotate the disk within the cartridge case; and a head access opening formed in each of the upper and lower shells between the central axis and the front peripheral edge for accessing the disk;
 a shutter having an opening which opens and closes the head access openings, the shutter being slidably disposed on the front peripheral edge of the cartridge case between open and closed positions; and
 means for removing debris from the surface of the disk, the removing means comprising:
 two wipers made of cleaning material, each having a surface area covering the entire recording surface area of one side of the disk and being disposed between one side of the disk and the respective upper and lower shells;
 biasing means mounted on one shell for biasing the wipers into contact with the disk; and
 a series of substantially parallel ribs mounted on the other shell opposite the biasing means, wherein the ribs are oriented in a direction generally parallel to the radius of the disk and extend for substantially the entire radius of the disk to locate the ends of the ribs outside of the data recording area and to maintain constant contact between each wiper and the respective surface of the disk along substantially the entire radius of the disk.

6. The disk cartridge of claim 5 wherein the biasing means is mounted on the lower shell and the series of ribs is mounted on the upper shell and the cleaning means maintains a minimum level of wiping pressure on the disk along the entire radius of the disk.

7. The disk cartridge of claim 6 wherein the biasing means comprises a lifter mounted at one end to one of the upper and lower shells and extending away from the shell on which it is mounted at its opposite end.

8. The disk cartridge of claim 5 wherein the ribs have slots at various radial locations along their length.

9. The disk cartridge of claim 8 wherein the slots in adjacent ribs are located at different radial locations along their length to insure that all radial locations on the disk are effectively cleaned.

* * * * *

UNITED STATES PATENT AND TRADEMARK OFFICE
CERTIFICATE OF CORRECTION

PATENT NO. : 5,083,231

DATED : January 21, 1992

INVENTOR(S) : Kevin C. Veenstra and Jon R. Clark

It is certified that error appears in the above-identified patent and that said Letters Patent is hereby corrected as shown below:

Col. 6, line 7, "outer" should read --other--.

Col. 6, line 48, after "disk", insert --,--.

Signed and Sealed this

Nineteenth Day of May, 1992

Attest:

DOUGLAS B. COMER

Attesting Officer     Acting Commissioner of Patents and Trademarks